United States Patent
Bakker et al.

(10) Patent No.: US 10,653,163 B2
(45) Date of Patent: May 19, 2020

(54) CHEWY CANDY COMPRISING A HIGHLY BRANCHED STARCH (HBS) AND METHOD FOR PROVIDING THE SAME

(71) Applicant: Coöperatie AVEBE U.A., Veendam (NL)

(72) Inventors: Wybren Bakker, Veendam (NL); Pieter Lykle Buwalda, Veendam (NL); David Thomas Benjamin Tomasoa, Veendam (NL)

(73) Assignee: Coöperatie AVEBE U.A., Veendam (NL)

( * ) Notice: Subject to any disclaimer, the term of this patent is extended or adjusted under 35 U.S.C. 154(b) by 297 days.

(21) Appl. No.: 15/309,234

(22) PCT Filed: May 8, 2015

(86) PCT No.: PCT/NL2015/050321
§ 371 (c)(1),
(2) Date: Nov. 7, 2016

(87) PCT Pub. No.: WO2015/170983
PCT Pub. Date: Nov. 12, 2015

(65) Prior Publication Data
US 2017/0119011 A1  May 4, 2017

(30) Foreign Application Priority Data
May 8, 2014  (EP) .................................. 14167562

(51) Int. Cl.
*A23G 3/42*  (2006.01)
(52) U.S. Cl.
CPC ............ *A23G 3/42* (2013.01); *A23V 2002/00* (2013.01)
(58) Field of Classification Search
CPC .............................. A23V 2002/00; A23G 3/42
USPC .................................................. 426/578, 660
See application file for complete search history.

(56) References Cited

U.S. PATENT DOCUMENTS

| | | |
|---|---|---|
| 2002/0192343 A1 | 12/2002 | Serpelloni |
| 2006/0134311 A1* | 6/2006 | Mueller ................... A23G 3/42 426/660 |
| 2010/0029928 A1* | 2/2010 | De Vries ................ A61K 8/046 536/109 |
| 2010/0099864 A1* | 4/2010 | van der Maarel ...... C08B 35/00 536/102 |
| 2011/0033600 A1* | 2/2011 | Buwalda .................. A23G 3/42 426/578 |
| 2015/0282499 A1 | 10/2015 | Lagache et al. |

FOREIGN PATENT DOCUMENTS

| | | |
|---|---|---|
| AU | 2002253266 B2 | 10/2002 |
| EP | 1342417 A1 | 9/2003 |
| EP | 1943908 A1 | 7/2008 |
| FR | 2338651 A1 | 8/1977 |
| JP | H108026 A | 1/1998 |
| JP | 2001294601 A | 10/2001 |
| JP | 2004-525637 A | 8/2004 |
| KR | 880000981 B1 | 6/1988 |
| WO | 2002/079263 A1 | 10/2002 |
| WO | 02082926 A1 | 10/2002 |
| WO | 2008044586 A1 | 4/2008 |
| WO | 2009080838 A2 | 7/2009 |
| WO | 2013106363 A2 | 7/2013 |
| WO | 2014076429 A1 | 5/2014 |

OTHER PUBLICATIONS

International Search Report, International Application No. PCT/NL2015/050321, International Filing Date May 8, 2015, Applicant Coöperatie AVEBE U.A.
Database WPI, Week 200835, Thomson Scientific, London, GB, AN 2008-F37756, XP002731946.
Database WPI, Week 199812, Thomson Scientific, London, GB, AN 1998-126419, XP002731947.
Database WPI, Week 200218, Thomson Scientific, London, GB, AN2002-134411, XP002731948.

* cited by examiner

*Primary Examiner* — Jyoti Chawla
(74) *Attorney, Agent, or Firm* — Hoffmann & Baron, LLP

(57) ABSTRACT

The invention relates to confectionery products and methods for producing them. Provided is a chewy candy comprising a starch-based gelling agent, wherein said gelling agent is a highly branched starch (HBS), preferably wherein said HBS has a molecular branching degree of at least 6%, more preferably at least 6.5%. In a specific aspect, the chewy candy is essentially free of gelatin or other animal-derived ingredient.

15 Claims, No Drawings

CHEWY CANDY COMPRISING A HIGHLY BRANCHED STARCH (HBS) AND METHOD FOR PROVIDING THE SAME

This application is the U.S. National Phase of, and Applicants claim priority from, International Patent Application Number PCT/NL2015/050321 filed 8 May 2015, which claims priority from EP 14167562.9 filed 8 May 2014, each of which is incorporated herein by reference.

The invention relates to gelled confectionery products, in particular chewy candies, and methods for producing them.

Consumers like gelled confections. Gelled confections are sometimes called gummies, jellies, or gum drops. Other examples include fruit chews, soft candy, licorice, marsh mellows, etc. Chewy gelled confections are often chewed as they have a firm, elastic texture that appeals to consumers. As gelled confections are chewed, they break apart into smaller pieces, which then dissolve in the mouth. These smaller confection pieces dissolve slowly in the mouth and deliver flavor and sweetness as they dissolve into a pleasant syrup during chewing.

Chewy candies contain at least one gelling agent. The gelling agent creates a gel matrix throughout the confection through its loosely connected strands. The amount and length of the gelling agent strands, and the connections between the strands, creates a flexible, elastic matrix with water filling the spaces between and around the strands.

Conventional gelling agents include polysaccharides such as alginates, pectins, carrageenans, Arabic gum, and starches such as degraded or oxidized starches. The use of locust bean gum bean derivatives has also been disclosed. Alternatively, there are proteins with similar properties such as gelatin, casein, potato protein fractions and the like.

The basis of a chewy candy is a sugar/glucose syrup combination and a gelatinizing agent, whereby during the processing no Maillard reaction is occurring. Examples of gelatinizing agents are gelatine, gum arabic, maltodextrin or a modified starch. A certain amount of fat is included to improve texture and prevent excessive stickiness in the mouth. The mixture after blending is pulled and aerated, which process results in a slightly elastic product having a short texture.

The chews have a lasting effect in the mouth, somewhat like chewing gum but without the presence of the insoluble gum base. The chewy candy can have a non-grained or grained texture, the latter can be obtained by sucrose recrystallization during pulling. To obtain an excellent lasting effect of the end product generally gelatin is used in the formulation. Chewiness is dictated by gelatin level. The other mentioned gelatinizing agents do not give rise to the desired elastic properties after pulling of the mass.

Gelatin is an important ingredient in gummy and marshmallow based confection applications. The unique elastic-like properties makes it an ideal ingredient. However, many of the known gelling agents suffer from one or more drawbacks. For example, gelatin, although having attractive physical properties, is often not a preferred gelling agent for this type of food products. Gelatin is animal derived and therefore vegan and vegetarians cannot eat products that are made with it. Furthermore, gelatin usually cannot be eaten by certain religious groups, unless strict separation of the animal slaughter rests is warranted leading to high costs. Still further, being animal derived implies that there is always a scare for food scandals as for instance mad cow disease, porcine fever, animal feed with dioxin, etc. Accordingly, there is a preference for gelling agents that are not of animal origin. In addition, the price of gelatin has risen due to a shortage of certain types of gelatin and increased demand in an already tight supply situation.

Gum arabic, also known as acacia gum, chaar gund, char goond, or meska, is a natural gum made of hardened sap taken from two species of the acacia tree; Senegalia (Acacia) senegal and Vachellia (Acacia) seyal. The gum is harvested commercially from wild trees throughout the Sahel from Senegal to Somalia, although it has been historically cultivated in Arabia and West Asia. Gum arabic is a complex mixture of glycoproteins and polysaccharides. It was historically the source of the sugars arabinose and ribose, both of which were first discovered and isolated from it, and are named after it. Gum arabic is used primarily in the food industry as a stabilizer. It is edible and has E number E414. Since the acacia tree grows in rather arid climates around the equator that are often visited by severe droughts and wars, the supply and hence pricing of Arabic gum is rather unreliable. Furthermore, the color of the products varies between light amber and very dark brown, the latter imparting problems in the manufacture of (semi) clear or transparent products.

Over the years many attempts have been made with starches to replace gelatin or gum Arabic. Starches are a well established gelling agent for soft candy, offering a range of textures for the reformulation or creation of different products. Starch-based ingredients can speed up drying times and improve processing efficiency as well as providing savings for manufacturers on raw materials. By replacing only a portion of the gelatin with starch-based products, the formula cost structures can be improved without significantly changing the finished product. For example, oxidized tapioca starches and modified corn starch have been shown to effectively offset 15-20% of the gelatin in formulations, for example in the production of soft and clear fruity gummy candy. Thus, partial gelatin replacement by starches to make the product more economically attractive is known in the art. In contrast, complete replacement of gelatin by a starch or starch derivative usually ended up in a product that is insufficient to meet the criteria for the properties of the final product, and/or for process for making it. Gelatin replacement in chewy sweets has already been the subject of a number of patent applications and publications. In EP1023841, the gelatine is replaced by an oxidised starch or more preferably by a combination of oxidised starch and gum arabic. The oxidised starch content of the chewy sweet product thereby may vary between 0.5 and 20% (w/w) but is situated preferably between 5 and 10% (w/w). In addition, the oxidised starch is combined with gum arabic, which is preferably used in a quantity of 1 to 8% (w/w). The examples of this application show that gelatine is replaced by an amount of oxidised starch and gum arabic. This amount is substantially higher than the quantity of gelatine normally used.

In EP 979611, gelatin is replaced by a combination of wheat gluten and maltodextrin. Thereby the wheat gluten is added in an amount of between 0.5 and 10% (w/w), preferably between 0.5 and 5% (w/w). The maltodextrin is used in an amount of between 0.5 and 15% (w/w), preferably between 0.5 and 5% (w/w). Wheat gluten is herein defined as vital wheat gluten, fractions of vital wheat gluten, modified wheat gluten, (partially) hydrolysed wheat gluten and/or mixtures thereof. The maltodextrin used has a DE (dextrose equivalent) from 0.1 to 20 DE, preferably between 4 and DE, and more preferably a DE of 5, and it may be obtained from any available starch source. Thereby, one single product, gelatin, is replaced by a combination of products, whereby the maltodextrin is cooked-up with the sugar-based mass while the wheat gluten is dispersed in water at 60° C. and incorporated into the mass just before or during pulling of the mass. WO2007/051485 discloses a chewy sweet, comprising a gelatinizing agent for providing a chewy texture to the chewy sweet, characterised in that the gelatinizing agent consists of a gliadin-enriched wheat gluten fraction.

Gluten is a protein in certain common grains including wheat, barley and rye. Because of the pervasiveness of these grains, gluten is found in vast numbers of commercially-available food products. The ubiquitous nature of gluten causes difficulty for everyone who is sensitive to gluten. Celiac disease—also referred to as gluten sensitive enteropathy or gluten intolerance—is an autoimmune disease which is considered to be one of the most misdiagnosed diseases of our time, and yet it potentially affects at least 1% of our population (approximately 3 million people). It results from an immune response to the ingestion of gluten that damages the small intestine. Nutrients pass through the small intestine rather than being absorbed. Among the myriad possible symptoms of celiac disease are diarrhea, weight loss, abdominal distention, weakness, muscle wasting, growth retardation, and malnutrition. To date, no remedy exists for celiac disease and the only treatment is a life-long gluten-free diet. Thus, the gelatin-free products according to EP0979611 or WO2007/051485 are not suitable for consumption by persons with celiac disease, wheat allergy, gluten sensitivity or autistic individuals who benefit from eliminating gluten from their diets.

The present inventors therefore set out to provide a plant-based gelling agent that can fully replace animal-derived products like gelatin, such that the final food product is suitable not only for vegetarians, vegans or religious groups, but also for those suffering (even without knowing) from a celiac disease. Furthermore, they aimed at using a natural source with a reliable availability and which does not suffer from major price changes. In particular, they aimed at providing gelatin- and gluten-free chewy candies and fruit chews which display a similar long lasting (elasticity), similar texture profile and similar mouthfeel as the standard type with gelatine.

It was surprisingly found that these goals could be met by the identification of highly branched starch (HBS) as a versatile gelling agent for food products. For example, HBS could fully replace conventional gelators including Arabic gom and gelatin without sacrificing the semi-soft, non-sticky and chewy properties of the product. Thus, highly branched starch delivers similar mouthfeel, stability and texture attributes provided by gelatin without compromising eating quality of the final confectionery product.

Accordingly, the invention provides a chewy candy or fruit chew composition comprising a starch-based gelling agent, wherein said gelling agent is a highly branched starch (HBS). The suitability of HBS as gelling agent in chewy candies has not been disclosed or suggested in the art. In contrast, the introduction of branched structures in starch is consistently correlated with a decreased tendency to gelate by retrogradation. For example, U.S. Pat. No. 6,803,459 B2 teaches that branched starches and branched starch hydrolyzates overcome the retrogradation problems typically associated with linear, unbranched starch molecules. The branched starches are said to be more stable in solution, resulting in reduced tendency to haze or precipitate.

US2009/0022872 likewise describes the manufacture and uses of densely branched starch having a marked retrogradation-resistance and improved aqueous solubility as compared to linear, liquefied starch.

EP0690170 B1 relates to a process that yields low viscosity starches that are stable in time, meaning that no after-gelling occurs. Branched starches are mentioned among the suitable starches.

US2012/121873 (A1) describes the application of branched starch as glue. Again a very stable and low viscosity, meaning no after-gelling, is observed.

JP2003144187 discloses a similar property of branched starch, by stating that even on refrigeration no gelling occurs.

EP1943908 relates to slowly digestible storage carbohydrate having a degree of branching of at least 8.5-9%, and the use thereof as food or feed product. Whereas it is generally mentioned that the food products may comprise bakery products including candy-bars, nothing is specifically taught or suggested to use it as gelatin replacer in a pulled (aerated) product like chewy candies or fruit chews. WO2008/044586 mentions the preparation of chocolate using highly branched starch.

JP H108026 discloses a starch gelatinization product prepared with starch branching enzyme. The starch-based product is used in gelled foods, including gellies. Nothing is mentioned about chewy candies or fruit chews.

Hence, the prior art fails to teach or suggest to use highly branched starch as gelling agent in a pulled (aerated) product like a chewy candy. It could not have been predicted that HBS as gelatinizing agent can give rise to the desired elastic properties after pulling of the mass, as is disclosed in the present invention.

Normal starch is composed of two constituents, the virtually linear amylose having alpha, 1-4 glycosidic linkages and the alpha, 1-6 branched amylopectin. There are also variants of starch with almost exclusively amylopectin (waxy) or containing a high amylose amount. Branching enzymes (BE) are enzymes capable of converting the alpha, 1-4 glycosidic linkages present in amylopectin and amylose to alpha, 1-6 bonds, thereby creating new branch points. When incubated with gelatinized starch the amylose and/or long side chains of the amylopectin are transferred to amylopectin with the creation of new alpha, 1-6 glycosidic linkages. This results to a shortening of the average side chain length and a significant reduction of the interaction capacity of the branched molecules.

Typically, the HBS for use in the present invention has a molecular branching degree of at least 4%, preferably at least 5%. In one embodiment, the HBS has a molecular branching degree of at least 6%. Preferably, it is at least 6.5%, for example in the range of about 7 to about 10%. The degree of molecular branching as used herein refers to the relative amount of $\alpha$-1,6 glycosidic linkages over the total of $\alpha$-1,6 and $\alpha$-1,4 glycosidic linkages (($\alpha$-1,6/($\alpha$-1,6+$\alpha$-1,4) *100%) and can be determined by methods known in the art, e.g. using a combination of reducing end determination/isoamylolysis (Palomo M et al. 2009 Appl. Environm. Microbiology, 75, 1355-1362; Thiemann, V. et al, 2006 Appl. Microb. and Biotechn. 72: 60-71) and measuring the total amount of carbohydrate present via the Anthrone/sulphuric acid method (see e.g. Fales, F. 1951 J. Biol. Chem. 193: 113-124). Typically, the degree of branching does not exceed 11-12%. The resulting starch derivative (herein referred to as HBS) has an average molecular weight (Mw) ranging between $0.5*10^5$ g/mol and $1*10^6$ g/mol, preferably between $0.8*10^5$ g/mol and $1.8*10^5$ g/mol, more preferably between $1*10^5$ g/mol and $1.6*10^5$ g/mol. The HBS typically has an average molecular weight (Mw) of about $1.2*10^5$ g/mol. Molecular mass can be determined using different techniques, known to the person skilled in the art.

The molecular weight of the HBS of the invention was determined by GPC-MALLS-RI from Wyatt, USA equipped with a multiangle light scattering instrument (DAWN EOS) and an online viscometer (Viscostar). Refractive index was determined with RI2000 (Schambeck, Germany). The following set of columns was used: as guard column PwXL (Viscotek, USA) and as chromatography columns arranged in series: G4000PwXL and G5000PwXL (Viscotek, USA). A mixture of 50 mM NaNO3 and 0.1 M NaCl and azide was used as running solution. The samples were solubilised in the buffer (mentioned above, 1 mg/ml) and filtered against 0.45 um before injection into the system. 0.2 ml was injected. Flow rate was 0.400 mL/min. Accuracy of the system was verified using dextrin standards (50K, 200K, 400K and 800K).

Whereas HBS is perfectly suitable as sole gelling agent, mixtures of HBS and other (plant-based) gelling agents are also envisaged. In one aspect, the chewy candy is essentially free of gelatin or other animal-derived ingredient. In one embodiment, the chewy candy is (also) free of any gluten. In a specific aspect, the chewy candy is gelatin-free and gluten-free.

In one embodiment, the chewy candy comprises HBS in an amount of at least 0.2%, preferably at least 0.5% percent by weight of the total composition. For example, chewy candies and fruit chews comprising about 0.5 to 1.5 weight %, e.g. around 0.8 w %, of HBS were found to have a good processability, the desired organoleptic properties and a long shelf-life (e.g. when stored at room temperature for up to at least one year).

Any native or unmodified starch may be used as starting material for obtaining the HBS for use in the present invention. For example, the highly branched derivative can be derived from non-GMO as well as GMO plant variants of various sources, such as potato, corn, wheat, tapioca, waxy potato, waxy corn, waxy tapioca, high amylose potato, high amylose corn etc.

In one embodiment, potato starch is used.

In addition, modified starches are suitable to be used including low DE maltodextrins or amylomaltase-treated starch (e.g. Etenia). In one embodiment, the starch derivative is alpha-amylase treated starch. Also encompassed are chemically modified starches. For example, the starting material is a starch derivative selected from the group consisting of the products of acid or enzymatic hydrolysis of starch and the products of the chemical and physical modifications of starch of any type.

The BE used can originate from any microbial source but preferably from a mesophilic or thermophilic microorganisms such as *Aquifex aeolicus* or *Rhodothermus obamensis*. Accordingly, in one embodiment the glycogen branching enzyme is a thermostable glycogen branching enzyme obtained from a mesophilic or thermophilic organism, preferably glycogen branching enzyme of *Aquifex aeolicus* or *Rhodothermus obamensis*.

The starches that can be branched are derived from any source. Well known to the artesian are starches from potato, tapioca, corn, wheat, sweet potato, banana, water chestnut, millet, rice, triticale, peas, lentils, beans, etc. These starches all have amylose to amylopectin ratios in the order of 1:3 to 1:7. Starches that consist of amylopectin for more than 95% are referred to as waxy starches. Again they can be derived from a number of sources. Potato, tapioca, corn, wheat, rice sorghum. Other sources of starches have elevated levels of amylose going from 30% to 90% of amylose on dry matter of starch. Well known examples are mung bean, wrinkeled pea, high amylose corn starches, etc. This list by is no means complete, but it is understood that starch, high amylopectin starch, or high amylose starch from any source is part of the invention.

Next to native starches starch, derivatives can be used as well as will be demonstrated by an example (vide infra). Many ways of derivatization are known to the artesian (O. B. Wurzburg, Modified starches—properties and uses, CRC Press Inc, Boca Raton US, 1986 ISBN: 0-8493-5964-3). These derivatizations encompass crosslinking, enzymatic degradation, acid degradation, oxidation, etherification, esterification, dry roasting, dextrinization, etc. Furthermore physical treatments are known as to render the starch into different functionalities. Drum drying, spray cooking and extrusion will make starch cold water soluble. A specific physical treatment is described in U.S. Pat. No. 5,725,676. In a dry heating process the starch is physically crosslinked to give the product properties of chemically crosslinked starch without adding chemicals (thermal inhibition). Alternatively, potato and banana starch can be heated at higher moisture levels (heat moisture treatment) to produce products with crosslinked performance, for example as is described in U.S. Pat. No. 5,489,340. It is understood that the invention relates to all the products that can be made using these derivatization techniques. In a preferred embodiment, the HBS is derived from food grade acetylated potato starch.

A chewy candy of the invention is, after some chewing, entirely consumed, i.e., dissolvable in the mouth. This type of product therefore is distinctly different from chewing gum pellet products having a crunchy coating. The individual compositional formats, which are present in the distinct segments of the confectionery product, may contain predominant amounts of water-soluble ingredients, such as sweeteners, which carry and aid in the release of flavors and other components. The distinct segments may have different hardness levels and different density levels. These characteristics may be used to design and alter the flavor release profiles. Thus, the different compositional make-up, hardness and density levels and segment location, i.e., core versus coating, may contribute to the flavor release profile, texture and mouthfeel sensations and overall consumer experience.

A chewy confection of the invention is an aerated soft confection containing air. Well known examples are fruit chews (such as those marketed under the tradenames MAO-MAM, MAMBA or Fruitella) and products such as nougat. The production typically encompasses sugar and sugar syrups, hydrocolloids, optionally whipping agents, optionally fats, colorant, sweeteners, etc. During processing a beating or pulling step or similar is applied, thereby softening the texture and dispersing the fat. The resulting product may be cut and packaged.

A chewy candy according to the invention typically comprises, in addition to the gelling agent, at least one sweetener including a saccharide, a sugar alcohol, or a combination thereof, in syrup and/or solid particulate or powder form, crystalline or amorphous. Suitable saccharides include monosaccharide, di-saccharide and poly-saccharide solids or syrups of sucrose (sugar), dextrose, maltose, dextrin, xylose, ribose, glucose, mannose, galactose, fructose (levulose), lactose, invert sugar, fructo oligo saccharide, partially hydrolyzed starch, high fructose corn syrup, polydextroses, corn syrup solids, or a combination thereof. Preferably, the chewy candy comprises sugar, syrup and fat. The amount of sweetener comprising a saccharide, a sugar alcohol, or a combination thereof present in the chewy cooked candy is about 30 to about 95 wt % based on the total weight of the chewy cooked candy, specifically about 40 to about 85 wt %, more specifically about 45 to about 75 wt %. The majority of confections are high in sugar, sugar syrups or polyols, with solids in the region of 68-72%.

The composition may contain usual ingredients such as a food-acceptable acid, for example, lactic acid, malic acid, tartaric acid, ascorbic acid, hydrochloric acid, citric acid, fruit juices, vegetable juices, fats etc. The amount added will depend on the final product but may be in the range of from 0.5% to 5%, in particular, from 1.0% to 2.5% by weight based on the weight of the (chewy) confectionery product. The confectionery product may further comprise a humectant such as glycerol, flavour, artificial sweetners for sugar free, products, emulsifiers e.g. lecithin, flavour enhancers e.g. talin, colour, protein, for example, egg white or milk protein in the case of aerated systems, and other additives, the amounts and type of which will depend on the end product. Suitable amounts of these additives are from 0.1% to 5%, in particular, from 0.2-2.0% by weight based on the weight of the chewy confectionery product. The remainder of the confectionery product is water and the amount of water in the finished chewy confectionery product of the invention may be from 5% to 20%, preferably from 6% to 15% by weight based on the weight of the hydrocolloid confectionery product.

Preferably, the confectionery composition of the present invention is a composition based on a syrup matrix comprising a solution of sugars, sugar substitutes and/or starch hydrolysate syrups (glucose syrup) in water. Other ingredients may be dissolved or dispersed within the syrup matrix in order to modify the texture, flavour and appearance of the end product as desired, for example, fats, flavourants, colouring agents, acids, hydrocolloids, maltodextrins, emulsifiers, sugar crystals, aerating agents etc.

Apart from the sugar-based or sugar-free mass ingredients, chewy candies are also characterized by the presence of a relatively important quantity of fat, present as an "oil in water"-emulsion in saturated sugar-based or sugar-free syrup. This fat may be of animal or vegetable origin and represents between 3 to 10% by weight of the total mass of the chewy sweet. Exemplary fats for use in the present invention include fats and oils of vegetable origin, animal origin, or a combination thereof. Suitable vegetable fats can include soybean, cottonseed, corn, almond, peanut, sunflower, rapeseed, olive, palm, palm kernel, illipe, shea, coconut, cocoa, cocoa butter, or a combination thereof. The forgoing vegetable fats can be hydrogenated to varying degrees as desired or separated by fractional crystallization. Suitable animal fats include dairy fats such as milk fat and butter. As used herein, the term "fat" refers to any lipid material and can be solid or liquid (e.g. oil). Exemplary lipid materials include triglycerides, fatty alcohols, fatty acids, or a combination thereof. The triglyceride is not limited although medium chain triglycerides, long chain triglycerides, and the like can be used. The melting point of the fat is not limited although fats having a melting point of about 36 to about 680° C. can be used. Specific fats include hydrogenated rapeseed oil, hydrogenated palm oil, hydrogenated palm kernel oil, hydrogenated soybean oil, hydrogenated peanut oil, hydrogenated cottonseed oil, hydrogenated coconut oil, or a combination thereof. In a specific embodiment, a refined hydrogenated rapeseed oil is used.

Exemplary flavourants (flavor, flavoring agent) that can be used include those artificial or natural flavors known in the art, for example synthetic flavor oils, natural flavoring aromatics and/or oils, oleoresins, extracts derived from plants, leaves, flowers, fruits, and the like, or a combination thereof. Non-limiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, or a combination thereof. Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

Also provided is a method for providing a gelled confectionery composition comprising HBS as gelling agent. A chewy candy or fruit chew of the invention can be readily prepared using common principles of sugar confectionery production.

By varying the ingredients used, the temperature of boiling, and the method of shaping, it is possible to make a wide variety of products. The principle of production essentially contains the following steps: 1) balance the recipe 2) prepare the ingredients 3) mix together the ingredients 4) boil the mixture until the desired temperature has been reached 5) cool 6) shape and 7) pack.

Hence, provided is a method for producing a gelled confectionery composition, preferably a vegetarian or vegan confectionery composition, comprising mixing together the ingredients, which at least include highly branched starch; boiling the mixture until the desired temperature has been reached; cooling the boiled mixture and shaping the cooled mixture into an article having a desired shape. Optionally, the shaped article is packed or wrapped. For example, the present invention also discloses a method for the preparation of chewy candies or fruit chews comprising the steps of: a) dissolving sugar, fat and HBS in water, add glucose syrup, cook to the desired temperature, and cool;

b) mix with other ingredients (e.g. colorants, flavourants, etc), d) cool the mass further, e) bring the cooled mass into desired form, preferably by pulling and cutting. During "pulling" air is incorporated into the mass, thereby providing a product having a density of between 1 and 1.2. After some additional cooling the mass is formed into pieces and wrapped. The obtained chewy candy has a similar texture profile and similar mouth feel as the standard type with gelatine.

Factors which affect the production and storage of sweets include the degree of sucrose inversion; the time and temperature of boiling; the residual moisture content in the confectionery and the addition of other ingredients. Sweets containing high concentrations of sugar (sucrose) may crystallize either during manufacture or on storage (commonly referred to as graining). Although this may be desirable for certain products, such as fondant and fudge, in most other cases it is seen as a quality defect.

When a sugar solution is heated, a certain percentage of sucrose breaks down to form 'invert sugar'. This invert sugar inhibits sucrose crystallization and increases the overall concentration of sugars in the mixture. This natural process of inversion, however, makes it difficult to accurately assess the degree of invert sugar that will be produced. As a way of controlling the amount of inversion, certain ingredients, such as cream of tartar or citric acid, may be used. Such ingredients accelerate the breakdown of sucrose into invert sugar, and thereby increase the overall percentage of invert sugar in the solution. A more accurate method of ensuring the correct balance of invert sugar is to add glucose syrup, as this will directly increase the proportion of invert sugar in the mixture.

The amount of invert sugar in the sweet must be controlled, as too much may make the sweet prone to take up water from the air and become sticky. Too little will be insufficient to prevent crystallization of the sucrose. About 10-15 percent of invert sugar is the amount required to give a non-crystalline product.

The temperature of boiling is very important, as it directly affects the final sugar concentration and moisture content of the sweet. For a fixed concentration of sugar, a mixture will boil at the same temperature at the same altitude above sea-level, and therefore each type of sweet has a different heating temperature which are known in the art.

Variations in boiling temperature can make a difference between a sticky, cloudy sweet or a dry, clear sweet. An accurate way of measuring the temperature is to use a sugar thermometer. Other tests can be used to assess the temperature (for example, toffee temperatures can be estimated by removing a sample, cooling it in water, and examining it when cold). The temperatures are known by distinctive names such as 'soft ball', 'hard ball' etc., all of which refer to the consistency of the cold toffee. The water left in the sweet will influence its storage behaviour and determine whether the product will dry out, or pick up, moisture. For sweets which contain more than 4 percent moisture, it is likely that sucrose will crystallize on storage. The surface of the sweet will absorb water, the sucrose solution will subsequently weaken, and crystallization will occur at the surface—later spreading throughout the sweet.

The addition of certain ingredients can affect the temperature of boiling. For example, if liquid milk is used in the production of toffees, the moisture content of the mixture immediately increases, and will therefore require a longer boiling time in order to reach the desired moisture content.

Added ingredients also have an effect on the shelf-life of the sweet. Toffees, caramels, and fudges, which contain milk-solids and fat, have a higher viscosity, which controls crystallization. On the other hand, the use of fats may make the sweet prone to rancidity, and consequently the shelf-life will be shortened.

There are three main ways by which to boil the sugar solution: a simple open boiling pan; a steam jacketed pan or a vacuum cooker. Steam jacketed pans are often fitted with scrapers and blades which make the mixing and heating process more uniform, and lessen the possibility of localized over-heating. Vacuum cookers are not generally used at a small scale. All sweets are cooled slightly before being shaped. Most simply, the boiled mass is poured onto a table, which ideally is made from metal, stone, or marble to cool the product uniformly. The table should ideally be clean and free from cracks, as they may harbour dirt and microorganisms. It is important that the boiled mass is cooled sufficiently, since if it is to be formed by hand there is a danger that the operator may suffer burns.

The process may involve beating, which is a process which controls the process of crystallization and produces crystals of a small size. For example in the production of fudge, the mass is poured onto the table, left to cool, and then beaten with a wood or metal beater.

There are two main ways of forming sweets: cutting into pieces, or setting in moulds. Moulds may be as simple as a greased and lined tray. Other moulds can be made from rubber, plastic, metal, starch, or wood. It is possible to make starch moulds by preparing a tray of starch (e.g. potato starch or cornflour), not packed too tightly. Impressions are then made in the starch using wooden shapes. The mixture is poured into the impressions and allowed to set.

One aim of all manufacturers of chewable confectionery is to produce a product having a desirable level of hardness. A certain level of hardness is essential for full enjoyment of the confectionery. The confectionery or candy must, on the one hand, not be too hard otherwise it will not be chewable and, on the other hand, must not be too soft otherwise it may stick to the teeth or may not have the desired permanence when chewed. The candy also, of course, needs to be stable on storage such that hardness of the product is not affected disadvantageously by being stored for several weeks. Furthermore, according to one conventional method of manufacture, a cooked, sweetened mass is stamped into a desired shape and subsequently wrapped for sale to the customer. In order to achieve successful stamping, the cooked mass must meet certain requirements, particularly dimensional stability. These requirements were fully met using highly branched starch as (sole) gelling agent.

Powder food acids also may be added to the finished composition to make the product sour or sugar crystals can be added to make the composition sweet. Additional processing also could be carried out on the chewy or gummy confection, such as candy coatings or other confection coatings that are known to be adhered to chewy or gummy confection candies.

When sweets are stored without proper packaging, especially in areas of high humidity, the sucrose may crystallize, making the sweet sticky and grainy. Traditional packaging materials such as banana or sugar-cane leaves are often used to wrap sweets. However, these do not provide sufficient protection for a long shelf-life because they are not efficient barriers to moisture and cannot be securely sealed.

Alternatively, individual wraps can be made from waxed paper, aluminum foil, and cellulose film, or a combination of these. In most cases, the sweets will be wrapped by hand, but for higher production, semi-automatic wrapping machines are available. For further protection, the individually-wrapped sweets may be packed in a heat-sealed polythene bag. Sweets can also be packaged in glass jars, or tins with close fitting lids.

A further aspect of the invention relates to providing an alternative for, or a replacer of, gelatin. Gelatin, a unique hydrocolloid, serves multiple functions in a wide range of applications. They include the following:

"Melt-in-mouth" perception that leads to intensive flavor and aroma release. Scientists have not yet been able to find a gelling protein or polysaccharide that universally replicates this property.

Thermally reversible gel. Some plant hydrocolloids, such as carrageenan and agar, form thermally reversible gels, but melting points are significantly higher.

Surface activity. Although gelatin does not perform as well as gum Arabic, in regards to emulsifying/stabilizing properties, it still is an important characteristic.

Customization ability. Gelatin is available in different gel strengths and particle sizes.

Easy to use. Gelatin gels within the pH range typical of foods and does not require salts, sugars or food acid additions to set.

The main sources of gelatin include pigskin, cattle bones and cattle hide. Gelatin replacement is a major interest, due to emerging and lucrative halal, kosher and vegetarian (including Hindu) markets. In the 1980s, gelatin replacement gained increased attention, especially in Europe, with the emergence of bovine spongiform encephalopathy (BSE). It has been less of a concern to consumers in the U.S., and, in 2003, the FDA stated that [in gelatin processing] "the reduction in BSE infectivity is sufficient to protect human health."

Many proposed gelatin alternatives are polysaccharides, which form gels, but which do not have the defined melt set characteristics of gelatin, such as gellan-, alginate- or carrageenan-based gels. For example, pectin, carrageenan or combinations of pectin/carrageenan give similar textures as gelatin, but not quite the exact melt-in-mouth temperature profiles. These polysaccharide-based gelatin alternatives also generally have higher viscosities than gelatin. Surprisingly, highly branched starch was found to impart all the desirable characteristics to the confectionery products without compromising the workability of compositions during processing. This effect could not be achieved using other starch-based agents, like alpha-amylase treated starch.

EXPERIMENTAL SECTION

Materials and Methods

The starch used is common potato starch and Food grade acetylated potato starch (Perfectamyl AC by AVEBE u.a.). The branching enzyme used was the product NS28067 of Novozymes, containing the branching enzyme of *Rhodothermus obamensis*. Gum Arabic was obtained from Nexira and gelatin 240 bloom was obtained from Rousselot. Sugar is a regular product of Royal Cosun, the glucose syrup of DE 42 is obtained from Belgagluc. Amylogum CLS is an alpha amylase-treated acetylated starch product of AVEBE. Emulsifier is Leciprime 1000 IP from Cargill. Sorbitol was obtained from Cargill.

Branching Enzyme Activity

The activity of the enzyme is determined by monitoring changes in the iodine/iodide/amylose complex as a result of the branching enzyme activity. A substrate solution is prepared by adding 10 mg Amylose type III (Sigma) to 0.5 ml 2 M NaOH, subsequently adding 1 ml ultra pure water and then adjusting the pH by adding 0.5 ml 2 M HCl and 7.8 ml phosphate buffer (pH 7.2). An iodine/iodide stock solution is prepared by adding 0.26 g $I_2$ and 2.6 g KI to 10 ml ultra pure water. To 100 microliter of this stock solution 50 microliter 2 M HCl is added and 26 ml ultra pure water (stop reagent). The activity of the enzyme is determined by mixing 50 microliter of appropriately diluted enzyme to 50 microliter of amylose substrate solution and incubation this for 30 min at 60° C. Then 2 ml of stop reagent is added and after mixing well the absorbance is measured at 660 nm (the absorbance should be between 0.15 and 0.3). The activity is calculated using the following formula: The activity (U/mL) is calculated using the following formula:

$$U/ml = (OD_{reference} - OD_{sample}) \times 100\% \times dilution / (OD_{reference} - OD_{blank}) / 30 \text{ min}/0.05 \text{ ml}$$

Example 1: Branching of Starch 1 kg acetylated potato starch is mixed with 4 kg water and dissolved at 160° C. by means of a jetcooker. The solution is transferred to a reaction vessel and the temperature is set to 70° C. The pH to 6.2 with using 6N $H_2SO_4$ solution. The reaction is started by adding the branching enzyme (1000 Units/g dry weight. After reaction time of 19 hours, the reaction is stopped by lowering the pH to 2.7 using 6N $H_2SO_4$ solution and stirring for 30 minutes. The pH is adjusted back to pH 4.5. Before spray drying the salts are removed by ion exchange.

Example 2: Chewy Candy

The amounts of ingredients used to prepare chewy candy are listed Table 1. Three different gelling agents (gelatin, HBS or Amylogum) were used.

The ingredients of part A were mixed and cooked in a steam jacketed cooked. The system was closed. The dry matter content of part A before cooking was 81%. All ingredients were dissolved and heated to 70° C. and held at that temperature for 10 minutes. The system was heated to 124° C. and 5 bar and subsequently cooled to room temperature at ambient pressure and transferred to a bucket. Then, aqueous solution B (part B) was added. The resulting mixtures were transferred to a cooling table. The material was stretched and cooled until a thin film set on the surface. Thereafter, icing sugar (part C) was added. The doughy material was folding and transferred to a pulling machine. The doughy material was pulled for 3-4 minutes until a density of 1 was obtained, as was checked by putting a sample in water. The material was stretched and cooled. The products were cut and wrapped in a rolling machine. The resulting cubes were 2×2×2 cm in size. After a one week storage at room temperature, the products were evaluated by sensory analysis by expert confectionery specialist.

TABLE 1

| Recipe | % | Dry matter % | Gram |
|---|---|---|---|
| Part A | | | |
| Sugar SuikerUnie Kristalsuiker) | 38.9% | 100% | 8277 |
| Syrup (DE 38-40 Belgosuc) | 41.3% | 80% | 8777 |
| Fat (Canoletta Hartfett Walter Rau) | 4.3% | 100% | 922 |
| Emulsifier (Leciprime 1000 IP) | 0.1% | 90% | 12 |
| Sorbitol | 1.9% | 90% | 400 |
| Branched acetylated starch or gelatin or Amylogum CLS | 0.8% | 88% | 167 |
| Water | 9.4% | 0% | 2000 |
| Part B | | | |
| Citric acid (50:50 w/w) | 1.8% | 45% | 375 |
| Flavour Stockmeier 10277 | 0.3% | 0% | 57 |
| Exberry Farbton pink colour | 0.1% | 0% | 23 |
| Part C | | | |
| Icing sugar | 2.4% | 100% | 500 |
| Total | 100.0% | | 20575 |

It was observed that replacing gelatin with highly branched starch had no noticeable adverse influence on either the production process or the sensory characteristics of the aerated confectionery article. In contrast, the HBS-containing products had a better flavour release, chewable texture, good hardness, and elastic flexible dough.

An experiment carried out using in part A an alfa amylase treated acetylated starch (Amylogum CLS) instead of branched starch resulted not only in problems during rolling and cutting, but also in a much harder product.

The invention claimed is:

1. A soft chewable confection containing air comprising a starch-based gelling agent, wherein said gelling agent is a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of $\alpha$-1,6 glycosidic linkages of the total of $\alpha$-1,6 and $\alpha$-1,4 glycosidic linkages (($\alpha$-1,6/($\alpha$-1,6+$\alpha$-1,4)*100%), and wherein fat content is about 3 to 10% by weight of the soft chewable confection containing air.

2. The soft chewable confection containing air according to claim 1, wherein said HBS has a molecular branching degree of at least 6.5%.

3. The soft chewable confection containing air according to claim 1, wherein said HBS has an average molecular weight (Mw) ranging between $0.5*10^5$ g/mol and $1*10^6$ g/mol, preferably between $0.8*10^5$ g/mol and $1.8*10^5$ g/mol, more preferably between $1*10^5$ g/mol and $1.6*10^5$ g/mol.

4. The soft chewable confection containing air according to claim 1, wherein said HBS is obtained from starch or a starch derivative in a partially or completely gelatinized form.

5. The soft chewable confection containing air according to claim 1, wherein said starch or starch derivative is selected from native, unmodified and chemically modified starch derived from non-GMO as well as GMO plant variants, such as potato, corn, wheat, tapioca, waxy potato, waxy corn, waxy tapioca, high amylose potato, high amylose corn, and modified starches including low DE maltodextrins and amylomaltase-treated starch.

6. The soft chewable confection containing air according to claim 1, further comprising sucrose, glucose syrup, and at least one ingredient selected from the group consisting of fat, an emulsifier, a preservative, a coloring agent and a flavouring agent.

7. The soft chewable confection containing air according to claim 1, wherein said HBS is highly branched acetylated potato starch.

8. The soft chewable confection containing air according to claim 1, wherein said HBS is the sole starch-based gelling agent in the composition.

9. The soft chewable confection containing air according to claim 1, wherein the density of the soft chewable confection containing air is about 1-1.2 g/mL.

10. The soft chewable confection containing air according to claim 1, wherein the starch derivative is selected from the group consisting of products of acid or enzymatic hydrolysis of starch and products of the chemical and physical modifications of starch of any type.

11. The soft chewable confection containing air according to claim 10, wherein the starch derivative is alpha-amylase treated starch.

12. The soft chewable confection containing air according to claim 1, comprising HBS in an amount of at least 0.2 percent by weight of the total composition.

13. The soft chewable confection containing air according to claim 12, comprising HBS in an amount of at least 0.5 percent by weight of the total composition.

14. The soft chewable confection containing air according to claim 1, which does not contain gelatin.

15. The soft chewable confection containing air according to claim 14, which does not contain gluten.

* * * * *